US008662290B2

(12) United States Patent
Twigger et al.

(10) Patent No.: US 8,662,290 B2
(45) Date of Patent: Mar. 4, 2014

(54) CONVEYOR BELT CONDITION MONITORING SYSTEM

(75) Inventors: Mick Twigger, Charlotte, NC (US); George Mark Myers, Charlotte, NC (US); David Hurd, Charlotte, NC (US)

(73) Assignee: Fenner Dunlop Americas, Inc., Charlotte, NC (US)

( * ) Notice: Subject to any disclaimer, the term of this patent is extended or adjusted under 35 U.S.C. 154(b) by 204 days.

(21) Appl. No.: 13/119,894

(22) PCT Filed: Sep. 16, 2009

(86) PCT No.: PCT/US2009/057064
§ 371 (c)(1),
(2), (4) Date: Nov. 14, 2011

(87) PCT Pub. No.: WO2010/033527
PCT Pub. Date: Mar. 25, 2010

(65) Prior Publication Data
US 2012/0168281 A1 Jul. 5, 2012

Related U.S. Application Data

(60) Provisional application No. 61/098,461, filed on Sep. 19, 2008, provisional application No. 61/098,378, filed on Sep. 19, 2008, provisional application No. 61/098,389, filed on Sep. 19, 2008.

(51) Int. Cl.
*B65G 43/06* (2006.01)
(52) U.S. Cl.
CPC ..................... *B65G 43/06* (2013.01)
USPC ..................... 198/810.01; 700/230

(58) Field of Classification Search
USPC .......................... 198/810.01–810.03; 700/230
See application file for complete search history.

(56) References Cited

U.S. PATENT DOCUMENTS

| 3,597,756 A | 8/1971 | Jackson |
| 3,750,129 A | 7/1973 | Takeno et al. |
| 4,469,993 A | 9/1984 | Swanson et al. |
| 4,541,063 A | 9/1985 | Doljack |
| 4,577,502 A | 3/1986 | Cunningham |

(Continued)

FOREIGN PATENT DOCUMENTS

| DE | 4111358 A1 | 10/1992 |
| GB | 1328506 | 8/1973 |

(Continued)

*Primary Examiner* — Mark A Deuble
(74) *Attorney, Agent, or Firm* — Shumaker, Loop & Kendrick, LLP (57) ABSTRACT

A conveyor belt monitoring system is disclosed that uses sensors to measure magnetic disruptions ("events") in a conveyor belt which are indicative of one or more splice joints, rip panels and reinforcing cord damage. The system may comprise a plurality of sensing components, including coils or Hall Effect sensors for sensing rip panels, splices and generalized reinforcing cord damage. The system may also have RFID-based rip panels and may use RFID chips to identify various belt components. A PLC-based control system may communicate with the aforementioned components via an Ethernet link. Data received by the control system is used to chart belt wear and damage trends and to provide user alarms when signal levels exceed predetermined norms. The system may stop the belt when imminent belt failure is predicted. The PLC-based control system is highly scalable and will integrate easily into existing conveyor control systems and facility-wide monitoring systems.

39 Claims, 9 Drawing Sheets

(56) References Cited

U.S. PATENT DOCUMENTS

| | | | |
|---|---|---|---|
| 4,621,727 A * | 11/1986 | Strader | 198/810.02 |
| 4,646,912 A | 3/1987 | Houck et al. | |
| 4,854,446 A * | 8/1989 | Strader | 198/810.02 |
| 4,864,233 A | 9/1989 | Harrison | |
| 5,036,277 A | 7/1991 | van der Walt | |
| 5,059,903 A | 10/1991 | Otaka et al. | |
| 5,168,266 A * | 12/1992 | Fukuda | 340/676 |
| 5,426,362 A | 6/1995 | Ninnis | |
| 5,453,291 A | 9/1995 | Sasahara et al. | |
| 5,570,017 A | 10/1996 | Blum | |
| 5,986,452 A | 11/1999 | Hockey et al. | |
| 6,032,787 A | 3/2000 | Kellis | |
| 6,047,814 A * | 4/2000 | Alles et al. | 198/810.02 |
| 6,232,774 B1 | 5/2001 | Kimura | |
| 6,264,577 B1 | 7/2001 | Hutchins | |
| 6,585,108 B2 | 7/2003 | Travis | |
| 6,712,199 B1 | 3/2004 | Bruckner et al. | |
| 6,781,515 B2 | 8/2004 | Kuzik et al. | |
| 6,852,050 B2 | 2/2005 | Sands et al. | |
| 6,943,672 B2 | 9/2005 | Choi | |
| 8,069,975 B2 * | 12/2011 | Wallace | 198/810.02 |
| 2004/0149049 A1 | 8/2004 | Kuzik et al. | |
| 2004/0262132 A1 | 12/2004 | Pauley et al. | |
| 2006/0202684 A1 | 9/2006 | Brown | |
| 2006/0247868 A1 | 11/2006 | Brandstrom | |
| 2007/0102264 A1 | 5/2007 | Wallace et al. | |
| 2007/0193858 A1 | 8/2007 | Hillstrom et al. | |
| 2007/0278068 A1 | 12/2007 | Wallace et al. | |
| 2008/0133051 A1 | 6/2008 | Wallace et al. | |
| 2008/0257692 A1 | 10/2008 | Wallace | |

FOREIGN PATENT DOCUMENTS

| | | |
|---|---|---|
| GB | 1 368 363 | 9/1974 |
| GB | 1487978 | 10/1977 |
| GB | 2 210 840 A | 6/1989 |
| JP | 57-180517 A | 11/1982 |
| JP | 04159911 A | 6/1992 |
| RU | 2016404 C1 | 7/1994 |
| SU | 1558814 A1 | 4/1990 |
| WO | WO-97/05047 | 3/1997 |
| WO | WO-2007/026135 A1 | 3/2007 |
| WO | WO-2008/070678 A3 | 6/2008 |
| WO | WO-2008/090523 A1 | 7/2008 |

* cited by examiner

CONVEYOR BELT CONDITION MONITORING SYSTEM

REFERENCE TO RELATED APPLICATIONS

This application claims the benefit of International application No. PCTGB2006/003190 filed Aug. 29, 2006, and U.S. Provisional Ser. Nos. 61/098,389, 61/098,461, and 61/098,378, filed Sep. 19, 2008, each of which is hereby incorporated by reference.

FIELD OF THE INVENTION

The invention relates to systems for monitoring industrial conveyor belt systems, and more particularly to a system for obtaining and analyzing signals from a plurality of sensors to provide for comprehensive conveyor belt health management.

BACKGROUND

Conveyor belts and conveyor systems are well known systems used for the transport of a variety of materials and products. Conveyor belts are designed and used in heavy materials transport applications such as coal mining, ore mining, cement manufacturing operations, and the like. In many such applications, conveyor belts are located in underground mines where access to long stretches of belt and conveyor components is severely limited. In some cases direct visual observation of large portions of the belt run may be practically impossible. As can be appreciated, unexpected belt failures in these limited access areas can be dangerous and can cause substantial production delays.

As a result, methods and systems have been developed to monitor the condition of conveyor belts in operation in an attempt to predict when failures may occur. If such predictions are accurate, the conveyor system can be stopped and the belt repaired at an accessible location within the mine. While current systems offer some degree of automated monitoring, there is still a need for a fully automated belt monitoring system that is capable of collecting a variety of sensor data indicative of belt condition, and of providing comprehensive information regarding the belt to a user. There is also a need for an automated system that can sense a dangerous or imminent failure condition and can automatically stop the conveyor so that catastrophic system failure does not occur. Such a system should be modular and scalable to adapt to various belt types, sensors, and mine control equipment used throughout the mining industry. Further, the system should easily integrate with existing mine observation and control systems.

SUMMARY OF THE INVENTION

The disadvantages heretofore associated with existing systems are overcome by the disclosed design for a conveyor belt monitoring system. A conveyor belt condition monitoring system is therefore disclosed that includes a plurality of sensors for sensing a first property of a conveyor belt element, a processing system for receiving a signal from at least one of the plurality of sensors and analyzing the signal to assess a condition of the conveyor belt element, and a display for providing a visual representation to a user of the condition of the conveyor belt element.

The sensors may be arranged into groups and housed within a housing mounted adjacent to and spanning the entire width of the conveyor belt. The housing may be shaped generally complementarily to the cross section of the conveyor belt, and each group of sensors may analyze a corresponding belt channel, which is defined by an endless longitudinal section of the conveyor belt.

The display may be only a part of a user input and monitoring console operably connected to the processing system so that a user may interact with and control the monitoring system. The visual representation provided by the display may include one or more representative information configurations of the group consisting of: a learn mode configuration, a historical monitoring configuration, a non-historical monitoring configuration, a full-screen configuration, and a refined full-screen configuration.

In another aspect of the invention, the system may be operably connected to a data communications system(s), such as a facility-wide monitoring system for which conveyor belt monitoring is only a portion, an Intranet, a virtual private network, and/or the Internet so that the condition of the conveyor belt may be communicated, analyzed and assessed locally and/or remotely.

In another aspect, the conveyor belt elements analyzed by the sensors may comprise belt reinforcement cords, rip panels, and/or splice joints. In the case of one example of a certain type of rip panel, a radio frequency identification (RFID) chip may be electrically connected to a conductive loop in a rip panel of a conveyor belt. The loop may comprise legs extending across at least a portion of the width of the belt, and the chip is effective for energizing the loop thus sending a current through the legs. Additionally, an interrogation unit may be positioned in close proximity to the conveyor belt and in communication with the RFID chip for turning on the chip so that the loop is energized when the chip passes the interrogation unit during operation of the belt. If a rip occurs in the belt and affects the current flow through the loop, the RFID chip will communicate this information to the system's interrogator, which will provide this information to the processing system.

In yet another aspect, the system may include a programmable logic controller (PLC) connected via an Ethernet link for receiving data about the belt element. The controller has modules so that portions of the processing system may be selectively integrated into a facility-wide industrial monitoring system.

One object of the invention is to provide an improved conveyor belt condition monitoring system, which is capable of collecting a variety of conveyor belt sensor data indicative of belt condition, irrespective of the OEM belt or belt elements analyzed by the sensors, and provide comprehensive information regarding the condition of the belt to local and remote users. Another object of the invention is to provide such a system that is scalable to adapt to various belt types, sensors, and mine control and observation equipment and systems used throughout the mining industry. Related objects and advantages of the invention will be apparent from the following description.

BRIEF DESCRIPTION OF THE DRAWINGS

The details of the invention, both as to its structure and operation, may be obtained by a review of the accompanying drawings, in which like reference numerals refer to like parts, and in which.

DETAILED DESCRIPTION

An improved system is disclosed for collecting, analyzing and managing information relating to the physical condition of conveyor belting systems. Specifically, the disclosed system collects data from a variety of sensors mounted on or adjacent to a conveyor belt and analyzes characteristics of those signals to determine whether a damage condition, (e.g., such as a rip, reinforcing cord break, splice failure, or wear on the belt covers) exists or will soon exist in the belt. The analyzed data is presented to a user in an interactive display format to enable the user to make decisions about whether the belt should continue to operate or should be stopped for immediate repair. The system may also be capable of predicting an imminent failure of the belt and may automatically stop the belt to avoid or minimize catastrophic damage to the conveyor system and/or loss of the materials being carried on the belt.

Figure 1:
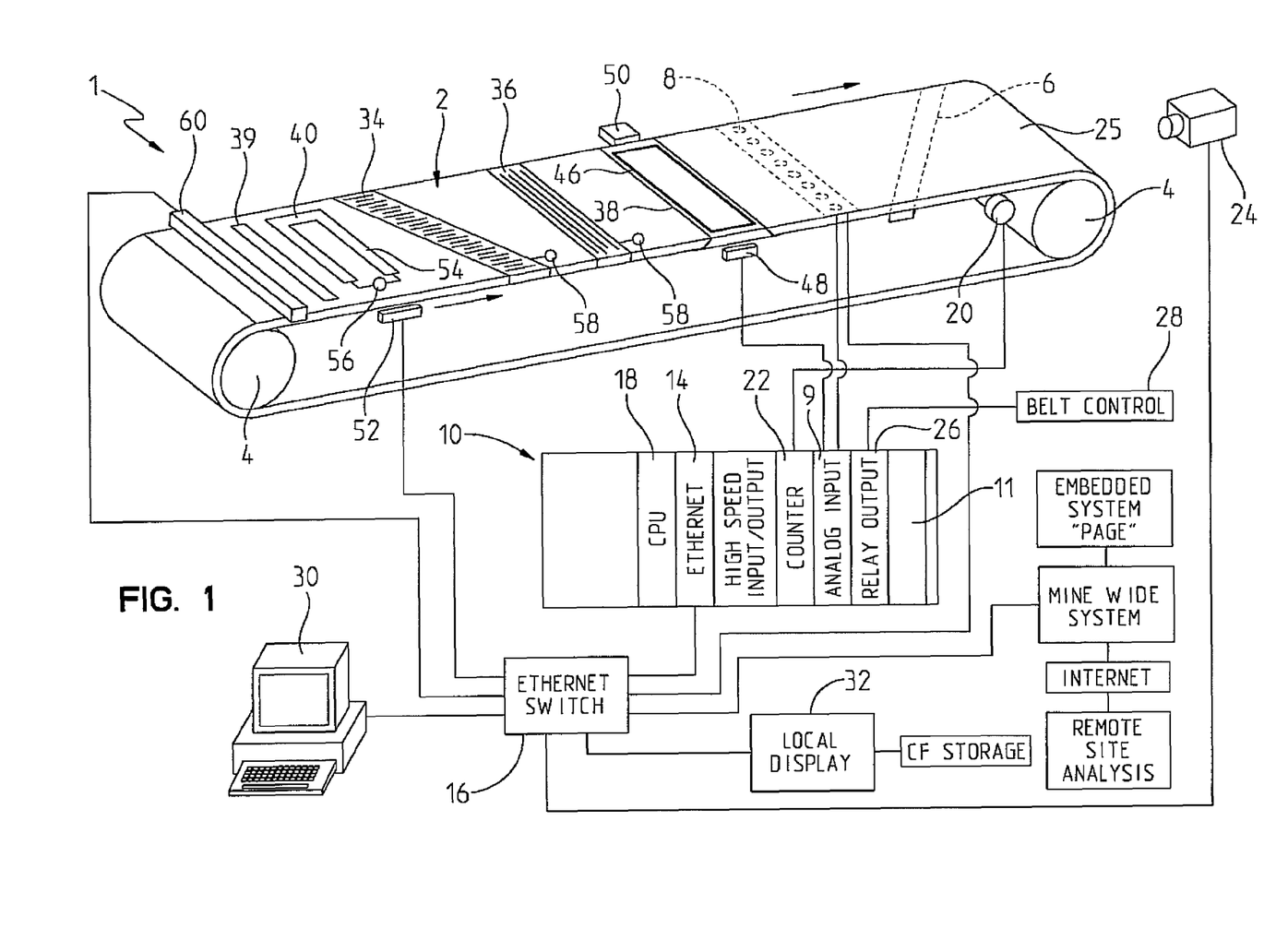
FIG. 1 is a schematic of an embodiment of the disclosed conveyor belt monitoring system.

Referring to FIG. 1, an exemplary conveyor belt monitoring system 1 is shown mounted adjacent to a conveyor belt 2 that moves in the direction shown by the arrows as a result of the rotation of one or more pulleys 4. The system 1 may comprise a permanent magnet 6 that spans the width of the belt 2 and is positioned above or below the belt in sufficiently close proximity that it magnetizes a portion of the belt 2. Specifically, the permanent magnet 6 will cause the magnetization of metal elements within the belt such as belt reinforcement cords, rip panels and splice joints.

A series of sensors 8 may be positioned across the width of the belt 2 to detect disruptions in the magnetic fields induced by the permanent magnet 6. Such disruptions are known to be indicative of certain physical conditions in the belt. For example, the disruptions can represent a break or damage in one or more of the belt reinforcing cords. They can also represent a normal or abnormal condition of a belt rip panel or a belt splice joint. As will be described in greater detail later, disruption magnitudes and trends can be used to predict the short term and long term health of the conveyor belt 2.

In one embodiment the sensors 8 comprise electric coils or Hall Effect sensors. The sensors 8 may be connected to a processing system 10, which in the illustrated embodiment is a programmable logic controller (PLC) rack system. The sensors 8 may be connected to a high speed analog input 9 of the processing system 10 (where the sensors comprise coils), or they may be connected to an Ethernet input 14 in the processing system via an Ethernet switch 16 (where the sensors comprise Hall Effect sensors).

Figure 2:
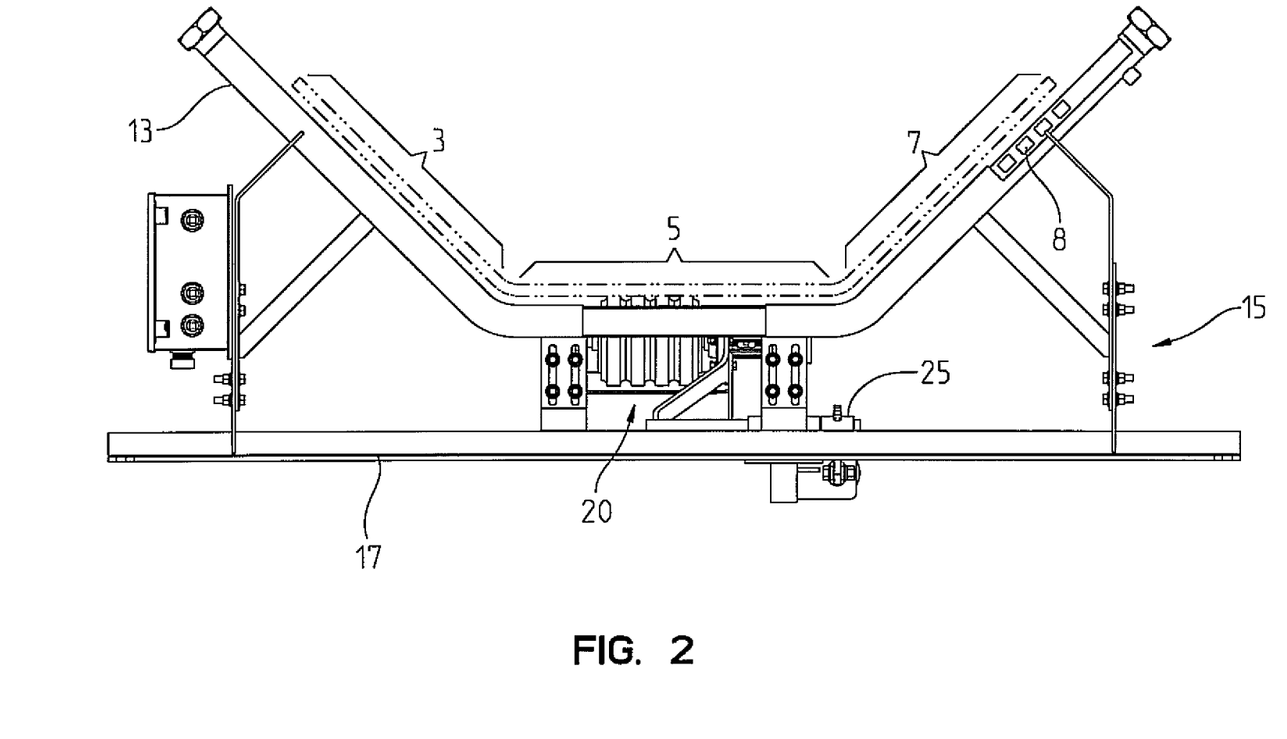
FIG. 2 is an exemplary sensor housing and encoder assembly for use in the system of FIG. 1.
Figure 2A:
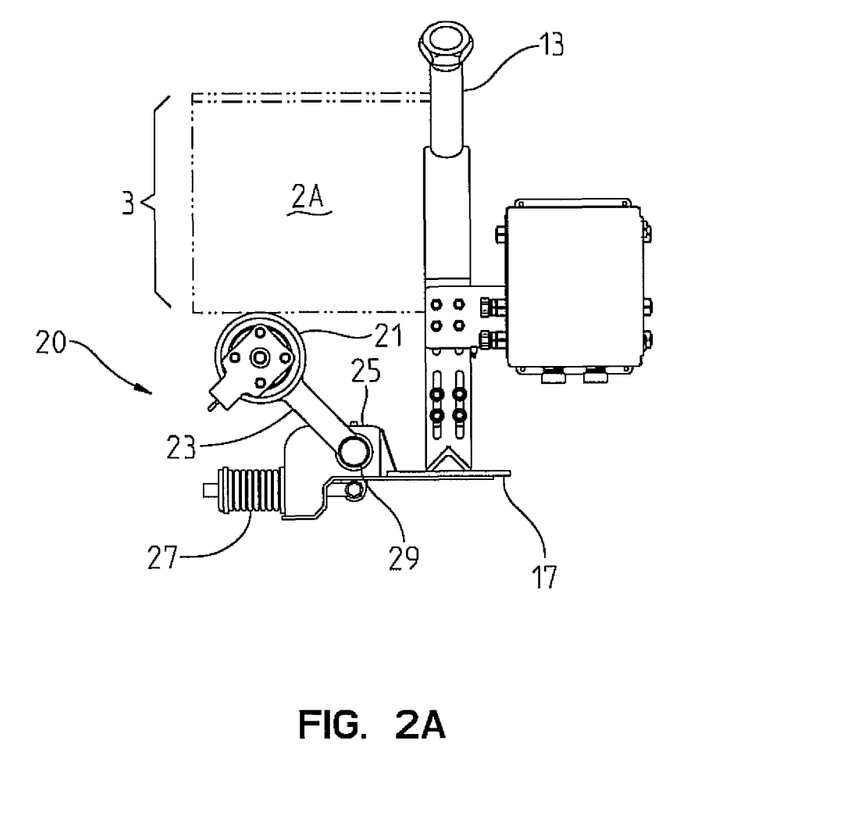
FIG. 2A is a side view of the sensor housing and encoder assembly of FIG. 2.

Referring to FIGS. 2 and 2A, one embodiment shows the groups of sensors housed within a parabolic shaped housing 13 that is shaped generally complementarily to the cross section of a troughed conveyor belt like the one, for example, shown in FIG. 2 where the belt's rollers (not shown) support the belt in a V or U shape to help prevent spillage of the conveyed material. In this manner, the sensors are positioned generally opposite, and correspond to, a generally flat underside surface portion 2A of the conveyor belt 2. As described below, analysis of the belt channels by the groups of sensors is optimal as a result.

The sensors 8 may be divided into groups, or belt channels, across the width of the belt so that two or more sensors 8 represent a single data channel for purposes of the analysis. In one exemplary embodiment, three channels divide the belt into three corresponding sections—left 3, center 5, right 7—for analysis. One embodiment shows the groups of sensors housed within a housing 13. The exemplary housing of the embodiment shown is shaped generally parabolically, or complementarily to the cross section of a troughed conveyor belt like the one, for example, shown in FIG. 3. Rollers (shown in 62) incrementally mounted adjacent to the belt along its distance support the belt in a V or U shape to help prevent spillage of the conveyed material. In this manner, the sensors are positioned generally opposite, and correspond to, a generally flat underside surface portion 2A of the conveyor belt 2. As described below, analysis of the belt channels by the groups of sensors is optimal as a result.

The encoder 20 in contact with the belt 2 may be used to obtain belt velocity measurements, and its signal may be input to a counter module 22 in the processing system 10 to enable the system 1 to map signals from the sensors 8 to physical locations on the belt 2. In one embodiment, the encoder is a wheel-type encoder in contact with the conveyor belt 2, like the one shown in FIG. 2A. For ease of installation to make necessary electrical connections simpler, the housing 13 and encoder 20 may be assembled as a unit via support assembly 15. The encoder 20 includes a wheel 21 mounted for rotation to an arm 23. The wheel is formed from plastic or rubber and includes an encoder mount 25 comprising a coil spring 27 and pivot assembly 29, which is connected to the base member 17 of the housing support 15 for biasing the wheel against the underside surface of the conveyor belt 2. The encoder 20 receives belt velocity data, converts it into an electronic signal representative of belt velocity, and transmits the signal to a counter module 22 included in the processing system 10.

As described in detail below, the signals received from the sensors are then directed to the CPU 18 for processing. The CPU 18 runs executable instructions that can be customized by the user to accommodate a variety of standard and customizable analytical functions.

The system 1 may also comprise a camera 24 for transmitting visual information regarding a top or bottom surface of the belt cover to enable the user to correlate information provided by the system with a visual indication of the belt at a desired location. More than one camera 24 may be used. Any or all of these cameras may be high definition cameras that are position adjustable and incorporate a zoom function. Such an arrangement may allow the system (or a user) to adjust the camera(s) to focus on particular areas of interest. The signal from the camera 24 can be routed to the processing system 10 through the Ethernet switch 16. The camera 24 may be controlled to take, for example, continuous video images, or to take a snapshot at a targeted location via a relay output module 26 of the processing system 10. The processing system may signal the camera to automatically take a picture based on a triggering event such as where a damage condition is sensed. The information from the camera may be incorporated into an e-mail and sent to a local or remote user.

The relay output module 26 may also provide a connection to a belt control system 28 to control the belt 2 as desired. Thus, the output module 26 may be used to instruct the belt control system 28 to slow the belt speed and/or to stop a targeted portion of the belt at a specific location within the mine so that the belt can be inspected and/or repaired. Alternatively, if the processing system 10 predicts an imminent failure condition in the belt, the output module 26 may instruct the belt control system 28 to immediately stop the belt regardless of its position.

Referring particularly to the diagrammatic elements of FIG. 1, the belt control system 28 may be part of a larger mine monitoring and control system that may include control (stop, start, change of speed) and observation capabilities for multiple conveyors and conveyor belts, and may allow two-way communication between the mine system and the disclosed monitoring system. In many instances, existing mine monitoring and control systems already operate in a PLC-based environment. Thus, the disclosed system's use of a PLC-based control system 10 allows easy integration with existing mine systems, in many cases eliminating the need for separate user-control hardware. In some embodiments, the disclosed system may simply be added as one or more new "pages" or screens in the existing mine monitoring and control system display.

A graphical user interface or user input and monitoring console 30 may be provided to enable a user to interact with and control the processing system 10 either locally or remotely. Where the monitoring console 30 is located remotely, the system 1 may include a local display 32 that can be positioned near the belt 2. The console 30 and local display 32 may be connected to the processing system 10 via the Ethernet switch 16.

As noted, providing a local display 32 may be advantageous for applications in which the console 30 is located in a remote control room or other remote location away from the conveyor belt. In one example, the console 30 may be located in a different geographic location from the conveyor belt, and may be connected to the processing system 10 via the company's intranet, a virtual private network (VPN), the Internet, or other appropriate data communications connection scheme. In such instances, the local display 32 would provide a local operator with access to the information generated by the processing system 10. The user input and monitoring console 30 and the local display 32 may be standard flat-screen information displays, or they may include touch screen functions to further enhance ease of use and interaction with the system.

As previously noted, the sensors 8 may be used to detect a break or damage in one or more of the belt reinforcing cords. They may also identify a belt rip panel, or a belt splice joint (as well as type of splice joint), or damage or deterioration of those elements. In the exemplary belt of FIG. 1, a splice joint 34 and three different designs for belt rip panels 36, 38, 39, 40 are shown. It is recognized that in normal application often only a single type of rip panel will be used, however multiple different panel types are shown in the present case for purposes of example. Likewise, a plurality of different splice joint types 34 can be monitored using the inventive system 1.

The splice joint 34 and rip panel 36 may be subjected to magnetization by the permanent magnet 6 as they pass over the magnet. The sensors 8 are configured to sense magnetic flux leakage that may manifest generally as disruptions in the splice joint and rip panel and to send the resulting signals to the processing system 10 for analysis and display to the user. Under normal operating conditions, each splice joint and rip panel will induce a particular signature signal in the sensors (see FIG. 3) representative of the particular arrangement of metallic components with the joint or panel. For example, the exemplary splice joint 34 may be a typical finger splice joint that may result in a signal 42 as graphically shown in FIG. 2. An exemplary rip panel 36, consisting of a plurality of closely spaced parallel metal cords, may also result in a signal 44, two examples of which are graphically shown in FIG. 3.

As the belt operates, changes in these signals are recorded by the processing system 10 and analyzed over time to provide the user with information about the short term and long term health of the belt. The same is true for generalized damage to the reinforcing cords. The system may be configured to record and store data regarding changes in the signals generated by each of these "events" (where an event is defined as a splice joint, a rip panel, or an instance of generalized reinforcing cord damage). Variations in belt speed may be taken into consideration when observing these signals. Information regarding the location of each of the "events" on the belt may be obtained from the encoder 20 (or alternatively through the use of specifically-placed RFID chips 58 located in or on the belt, or through the measurement of an electronic or magnetic signature of a belt component, or the like) so that a map of the belt is obtained and stored. By continually comparing the data regarding each event stored in the belt map against real time signal inputs from the sensors 8, the processing system 10 can provide the user with real time condition analysis of the belt (such as by identifying high or low amplitude spikes, or by identifying undesirably large rates of change in signal amplitudes for a particular event).

The system 1 can also accommodate alternative types of rip panels, such as the aerial type panel 38, or a non-metallic magnetic rip panel 39 (whose status will be read by the sensors 8), or a (non-)metallic conductive rip panel 40. The aerial type panel 38 may consist of one or more continual loops 46 of conductive wire. These loops are energized by a transmitter 48 located on the conveyor structure adjacent to one lateral side of the belt 2. The transmitter 48 induces a current through the loop(s) 46 when the rip panel passes. This current is sensed by a receiver 50 located on the opposite lateral side of the belt 2 from the transmitter 48. If a rip occurs in the belt 2 and crosses the rip panel 38, the rip will interrupt one or more of the loops 46. This, in turn, will disrupt the signal sensed by the receiver 50, and the resulting information will be provided to the processing system 10 via the analog input 9 or digital input 11 of the processing system 10 accordingly.

With the RFID-based rip panel 40, a separate interrogation unit 52 is provided adjacent one lateral side of the conveyor belt 2. Rip panel 40 may consist of a loop 54 of conductive material with an RFID chip 56 positioned in the loop. As the RFID chip 56 passes the interrogation unit 52, the unit turns on the chip 56, which in turn sends a small current through the loop 54. If a rip occurs in the belt 2 and crosses the rip panel 40, the chip 56 will recognize the break in the loop, and the interrogation unit 52 will provide this information to the processing system 10 via the Ethernet switch. Such RFID-based rip panels may be made from any of a variety of metallic or non-metallic conducting materials and may contain one loop or multiple loops as desired. Applicants' RFID-based rip panels are described in U.S. Ser. No. 61/098,378, now Applicant's International application No. PCT/US2009/057064, which is incorporated herein by reference.

As will be noted, the ability of the system 1 to gather an increased amount of data from various types of existing and new rip panels provides benefits heretofore unrealized. Additionally, it will be appreciated that although FIG. 1 shows a variety of components connecting to the processing system 10 directly via Ethernet switch 16, such an arrangement is simply an example of one method of connecting system components together. Thus, it is contemplated that one or more of the illustrated components could connect directly to a mine-wide system or subsystem, and that the signals from the components connected as such may be routed back to the processing system 10 via that mine-wide system or subsystem.

In addition to sensing the condition of individual components of the conveyor belt, the system 1 can also include one or more radio frequency identification (RFID) chips 58 for identifying individual belt system components. For example, each splice joint and rip panel may have an RFID chip 58 installed in the joint or panel or adjacent thereto. Each RFID chip 58 may have a unique identifier that informs the processing system 10 about the "event" that is being observed by the system. In addition to identifying the particular splice joint or rip panel, the RFID chip 58 may also contain detailed information about the splice joint or rip panel, such as when it was made or installed, its brand or design, its repair history (if any), and the like. The RFID chips may be embedded in the belt, sandwiched between belting layers, and/or vulcanized along with the belt, or vulcanized in a separate step.

In addition to providing belt reinforcement, splice, and rip assessments, the system 1 may provide the ability to monitor the thickness of the conveyor belt cover to allow the user to operate the belt 2 in a way that will maximize belt life. In one embodiment, the belt cover thickness is measured during manufacture using any of a variety of thickness measurement techniques. This original cover thickness information can be manually entered into the processing system 10 by the user, or it could be encoded in an RFID chip associated with the belt 2. The system 1 may include a laser scanner 60 positioned across the belt. The scanner 60 takes continuous cover thickness measurements and provides this information to the processing system 10 via the Ethernet switch 16. The processing system 10 may then track thickness reductions over the life of the belt to enable the development of belt cover wear trends that will result in an accurate prediction of belt life. This information may enable the user to run the belt in the most efficient manner, thereby maximizing belt life. Examples of appropriate laser scanners 60 may include those manufactured by NDC Technology.

In addition to providing electronic information regarding belt condition, camera 24 of the system 1 is capable of transmitting digital images of the conveyor belt top cover surface 25 to the processing system 10. The camera 24 may be positioned above or below the belt, as desired, and may run full time or in trigger mode (i.e., tied to the occurrence of an "event"). As previously noted, the camera 24 may be connected to the processing system 10 via the Ethernet switch 16. It may be controlled so that a photograph is taken each time an "event" occurs, to thereby provide the user with a visual picture of the condition of the belt. This may be particularly useful where the "event" represents generalized belt damage so that the user can perform a visual examination of the belt condition to note any obvious physical impairments, such as a reinforcing cord protruding from the cover, etc. The camera 24 may also provide a live video feed of the surface of the belt 2.

Figure 3:
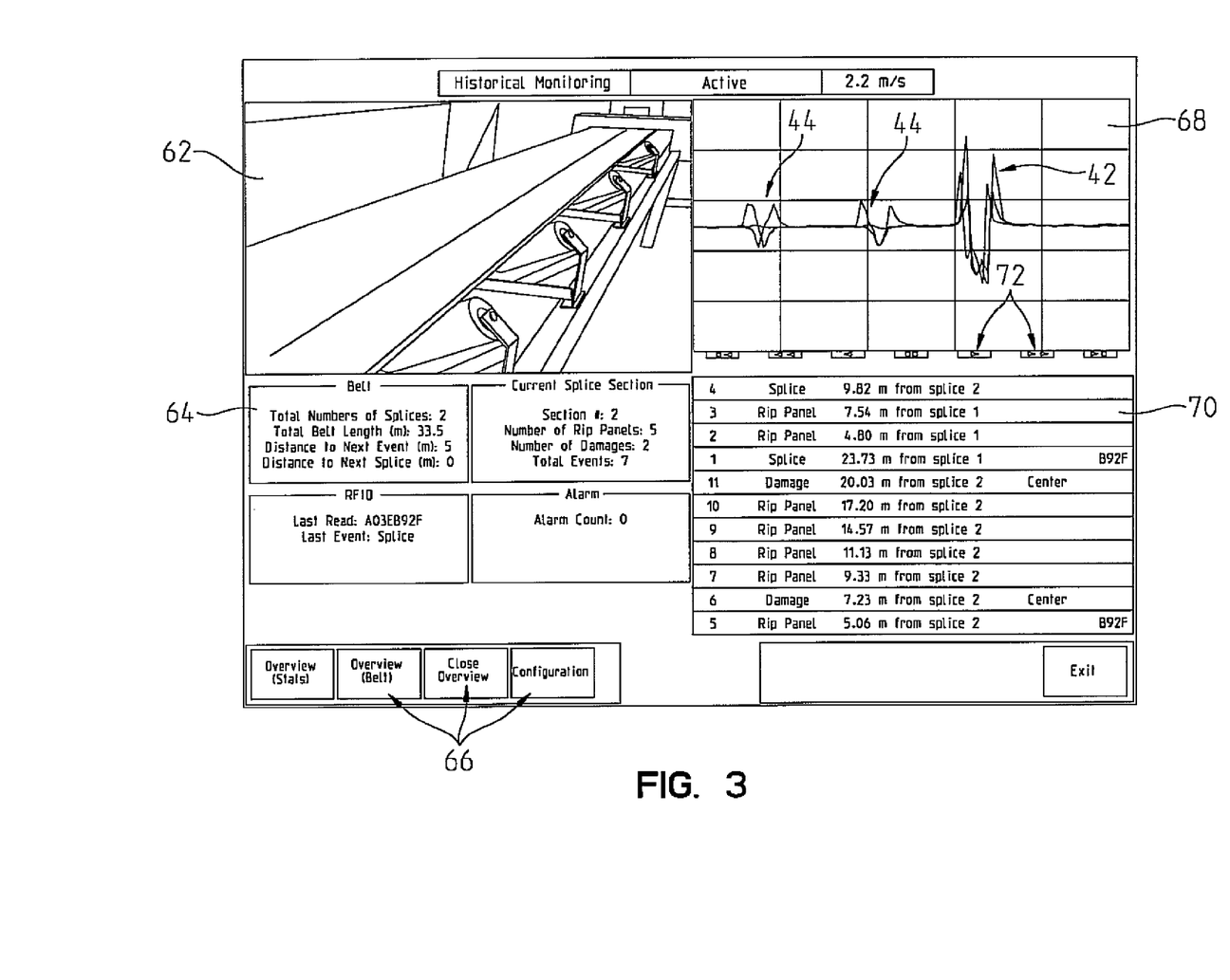
FIG. 3 is an exemplary user display generated using the system of FIG. 1.

Referring now to FIG. 3, an exemplary user/operator display screen is shown. This is an example of a display that may be shown on the user input and monitoring console 30. All or portions of this display are also available for viewing via the local display 32 as desired. As previously noted, any or all of the information in this display may be transmitted to remote users via a company's intranet, virtual private network (VPN), the Internet or the like to enable global viewing and control of the system 1. Remote viewing and control of the system may be secure, so that it is restricted only to certain designated individuals.

In the exemplary display of FIG. 2, the screen is cut into four windows. The first window 62 shows a picture or live video feed from the camera 24. The second window 64 contains information on the belt, including the total number of splices in the belt, the total belt length, distance to the next belt "event" and distance to the next splice. Note, this section may also contain a schematic of the conveyor belt showing the locations of splices moving along with the belt 2 in time. Additionally, the schematic may show the location of a selected "event" with respect to one or more splices. Larger size (better resolution) pages may be selected for display as well.

For the purposes of this disclosure, an "event" may be defined as anything that is observed on the conveyor belt, good or bad. Examples of observed "events" include (1) splice joints, (2) rip panels, and (3) generalized belt damage. The system 1 monitors these events to ensure that the user is aware of any changes in the events (e.g., rips in rip panels, unacceptable increase in damage, splice joint degradation) so that appropriate action may be taken. In some cases, the system 1 can operate to shut the belt down automatically if the magnitude of a change in a particular event exceeds a predetermined amount.

The second window 64 may also contain a count of the total number of events recorded for the belt (number of rip panels, number of damage spots, etc.). It may also contain information on the number of alarms triggered for the belt. Where the belt contains RFID chips associated with belt splices or rip panels, information regarding the RFIDs and their associated splice/rip panel may be provided. Soft keys 66 at the bottom of the second window may be provided to allow toggling between different display information to enable the user to customize the display to show a desired set of data for the monitored belt. These keys may be mouse-actuable or the screen may be a touch screen.

A third window 68 may provide a graphical representation of the signals received from the sensors 8 and/or the receiver 50 or interrogation unit 52. In the illustrated embodiment, the graphical representation in the third window 68 is of a signal received from the sensors 8. This representation can be shown as a real time feed, or it can be stopped to enable the user to view a particular event in detail. In the illustrated embodiment, a graphical representation of each of three channels is provided. In other words, the plurality of sensors 8 are divided into groups of three 3, 5, 7 representing the left side, right side and center of the belt. It will be appreciated that more than three channels may be used, depending on the system.

Three events are shown in the illustrated screen. The left two events 44 show a signal representative of an exemplary rip panel, while the rightmost event shows a signal representative of an exemplary splice joint 42.

The fourth window 70 may provide a listing of events recorded for the particular belt 2 being monitored. As can be seen, a listing of eleven individual events (splice, rip panel, damage) is shown, as are the distances of each event from a known location on the belt (e.g., a splice joint). During operation, this list may scroll so that the topmost event listed corresponds to that event's graphical depiction in the third window 68. For events that represent belt damage, the listing may also provide more detailed information about where across the belt the damage exists (e.g., right, left, center). Additionally, for events that represent splice joints, information may be provided to identify the type of splice joint present.

The user may view information about a particular event in the listing simply by clicking on that event, whereupon the graphical signal representation will be shown above it in the third window 68. Likewise, standard control buttons 72 are provided in the third window 68 to enable the user to control the graphical signal representation.

Figure 4A:
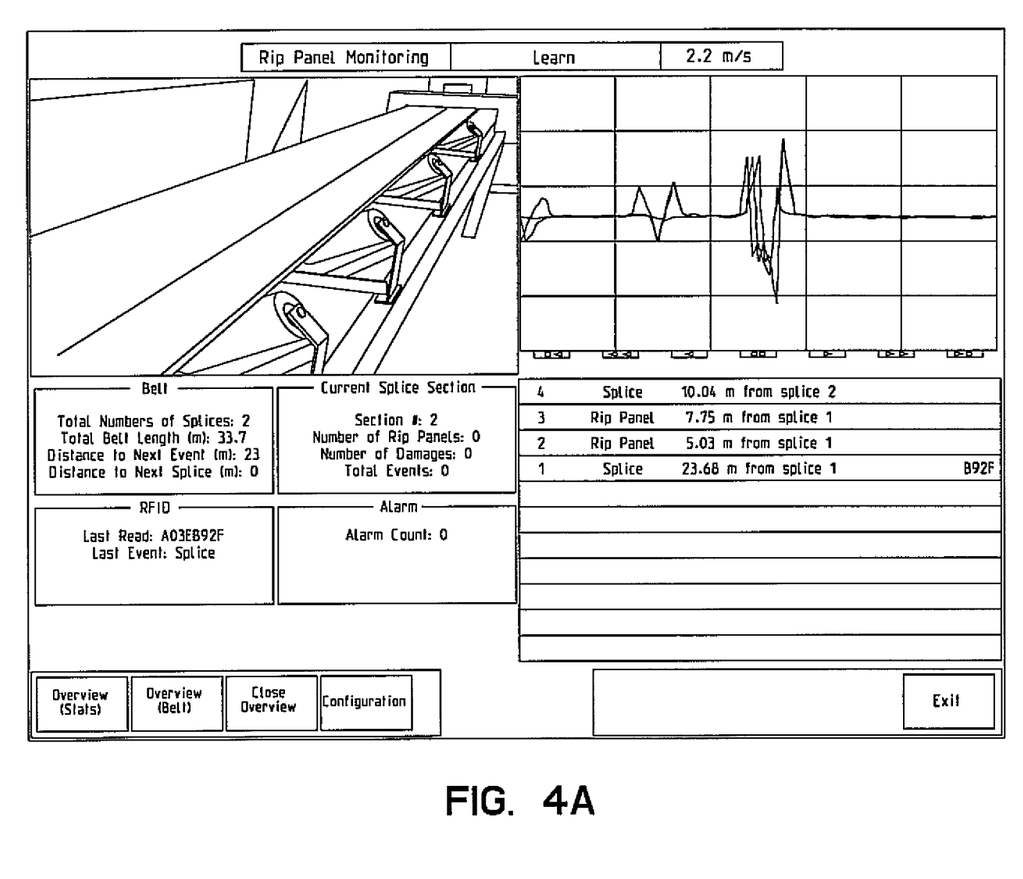
FIGS. 4A-4E are alternative user displays generated using the system of FIG. 1A.
Figure 4B:
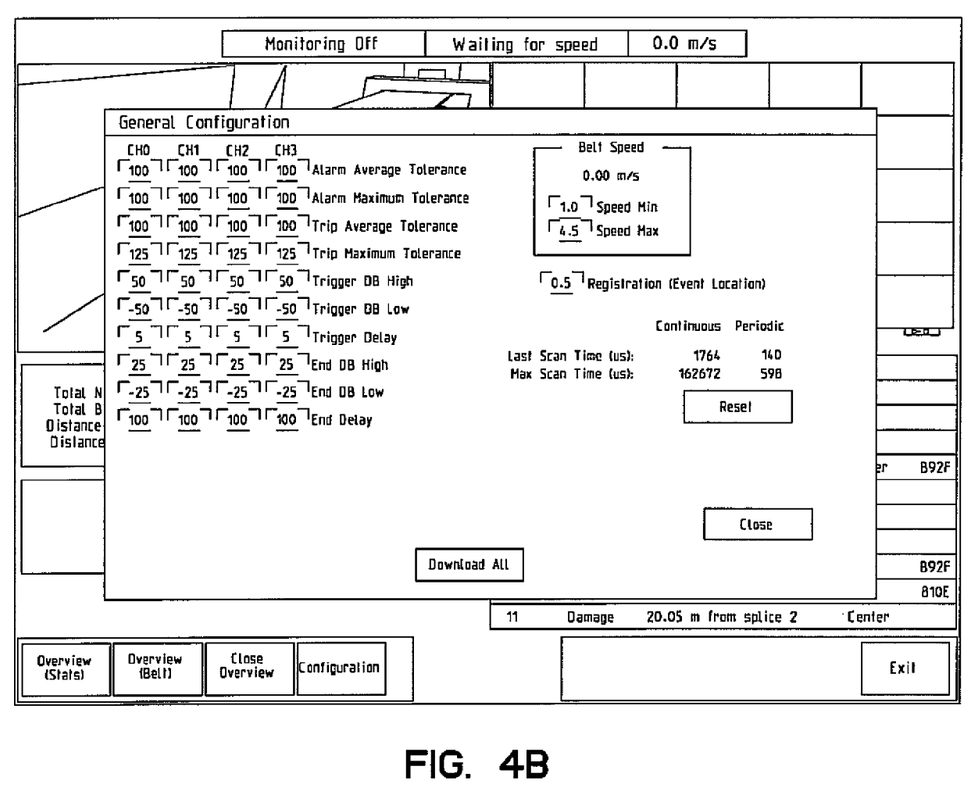
Figure 4C:
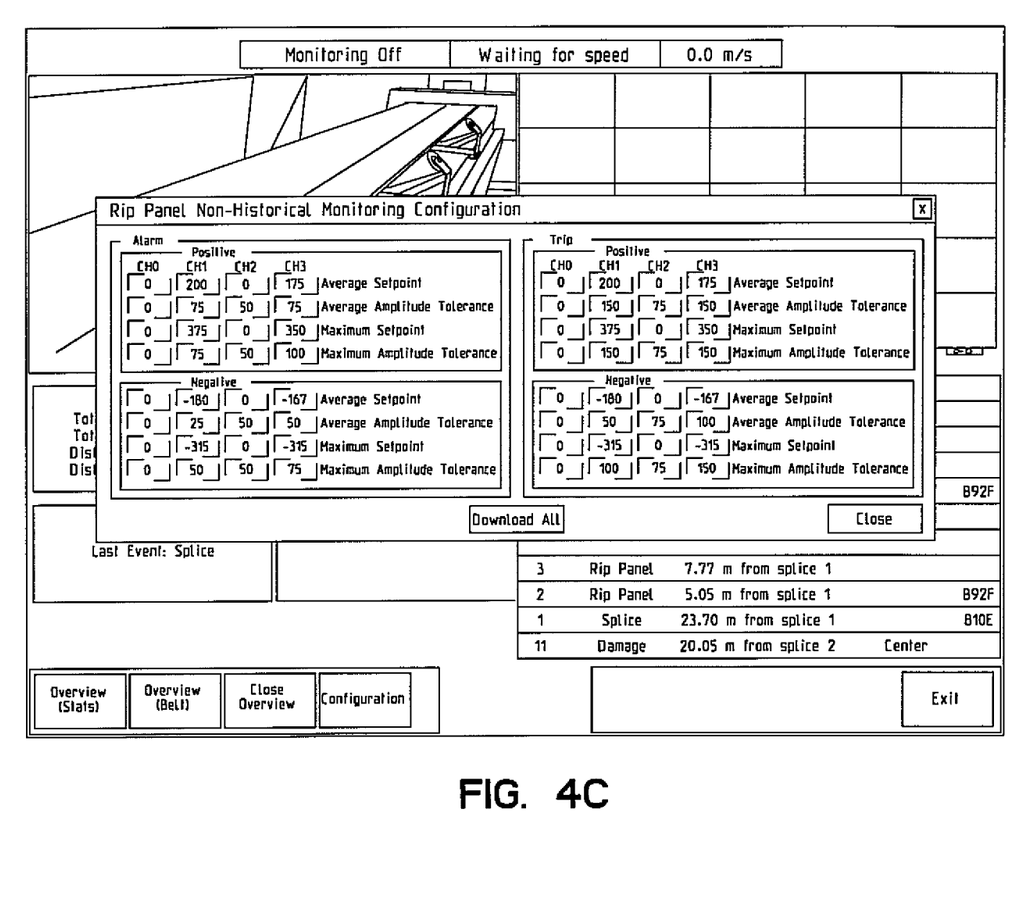
Figure 4D:
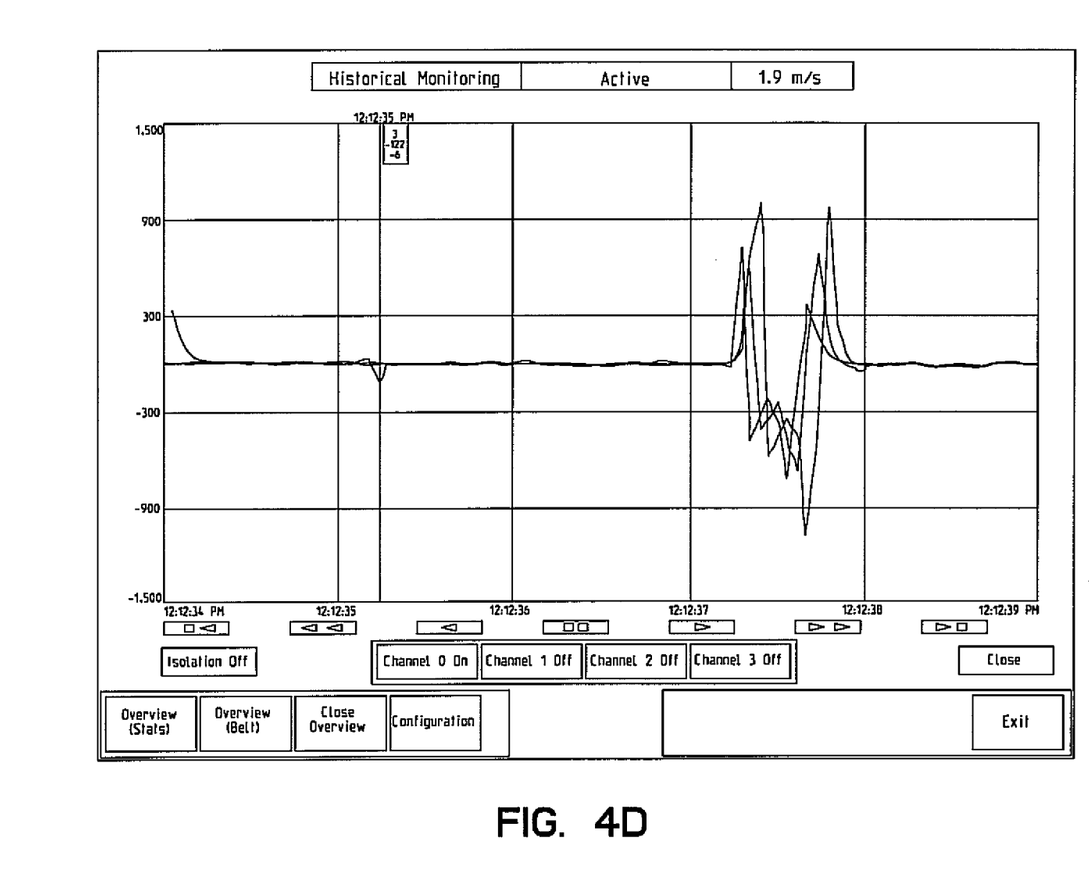
Figure 4E:
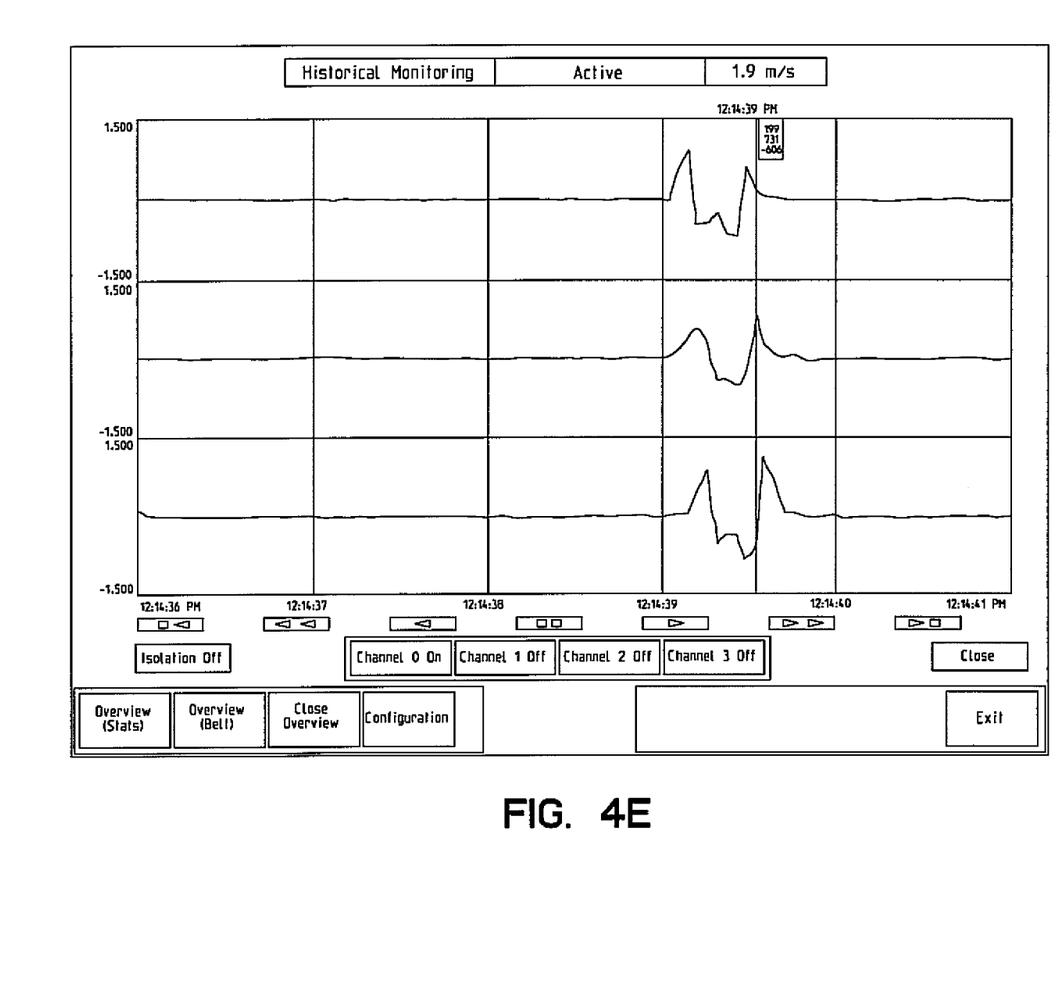

FIGS. 4A-4E show various alternative information configurations for display on the user input and monitoring console 30. Thus, FIG. 4A shows the system operating in "learn"

mode, in which four events have been learned and are populating the list in the lower right quadrant of the screen. A corresponding graphical representation of the input signals is shown above the list. FIG. 4B shows a general configuration of alarm and trip tolerances for the historical monitoring configuration, showing how the system can be customized to provide a plurality of individual alarm and trip tolerances on a per-channel basis. FIG. 4C shows a general configuration of alarm and trip tolerances for the non-historical monitoring configuration. FIG. 4D shows a full-screen representation of a splice joint event, with individual channels being displayed in different colors. This full-screen display may be activated by simply double-clicking on the graphical display quadrant of the normal display. FIG. 4E is a further refinement of the display of FIG. 4D in which each channel is represented separately. As can be seen, soft keys at the bottom of the screen allow one or more channels to be switched off so that the user can zero in on a particular channel of interest.

As previously noted, the processing system 10 will monitor signals from all sensors in the system and will control data collection and data manipulation functions for the overall system 1. The system may be programmable logic controller (PLC)-based so that it can take any of a variety of inputs and can output raw data, processed data, or other signals to a hard-wired local computer or other storage system, or to an Internet address for remote viewing. One such PLC-based control system is described in U.S. Ser. No. 61/098,461, now Applicant's International application No. PCT/US2009/057064, which is incorporated herein by reference.

The system may also send local and/or remote alarms as desired to alert one or more users to an abnormal condition of one or more conveyor belts. Such alarms can be audible, visual, or they can be sent to an e-mail address to alert local or remote users when abnormal belt conditions are sensed. The system will be scalable and highly compatible with systems such as RSView or RSWorks, manufactured by Rockwell Automation (Allen Bradley) that many companies may already have installed in their mines.

The PLC-based rack system (shown diagrammatically in FIG. 1) allows the addition of Ethernet, ControlNet, or DeviceNet cards, to enable communication with any of a variety of types of standard displays, which may be employed locally or remotely. The processing system 10 may also be IP addressable so any user can log into it directly from anywhere in the world. Thus, system 1 is robust and environmentally compatible with the mine environment.

The system is flexible and scalable, enabling quick and easy configuration to suit a variety of different users (e.g., some who want belt monitoring full, some who want rip sensing, some who only want splice identification, some who want thickness monitoring). The system also allows monitoring of a user's existing system components (rip panels, splices, legacy damage), while also implementing new features such as non-metallic rip panels, and so on.

Where the sensors 8 comprise Hall effect sensors, they are Ethernet-based, which provides distinct advantages in that there are no losses over distance, the units are plug-and-play, and they are also direct addressable to enable fault finding of individual sensors, since each has an individual IP address. This is also advantageous because it allows the easy use of multiple sets of sensors positioned at various locations along the length of the belt.

In addition, the disclosed system can immediately interact with the mine PLC to instruct the mine's existing belt control system exactly where to stop the belt when repairs are required.

It will be understood that the description and drawings presented herein represent an embodiment of the invention, and are therefore merely representative of the subject matter that is broadly contemplated by the invention. It will be further understood that the scope of the present invention encompasses other embodiments that may become obvious to those skilled in the art, and that the scope of the invention is accordingly limited by nothing other than the appended claims.

What is claimed is:

1. A conveyor belt condition monitoring system, comprising:
    a permanent magnet for magnetizing a metallic element of a conveyor belt;
    a plurality of sensors positioned adjacent the conveyor belt for detecting disruptions in magnetic fields induced by the permanent magnet;
    a programmable logic controller (PLC) for receiving a signal from at least one of said plurality of sensors and analyzing said signal to assess a condition of said metallic element; and
    a display for providing a visual representation to a user of said condition of said metallic element.

2. A system according to claim 1, wherein said PLC is connected to the system via an Ethernet link for receiving data about the metallic element, said controller having modules so that portions of the PLC may be selectively integrated into a facility-wide industrial monitoring system.

3. A system according to claim 2, further comprising at least one camera operably connected to the system for transmitting visual information regarding the conveyor belt to said display for viewing by a user.

4. A system according to claim 2, wherein said system further includes a conveyor belt control system for receiving a signal from said PLC and for directly or indirectly changing operation of the conveyor belt in response to that signal.

5. A system according to claim 1, wherein said system is operably connected to a data communications network, said network comprising one or more members of the group consisting of: a facility-wide monitoring system, an Intranet, a virtual private network and the Internet.

6. A system according to claim 1, wherein said system is operably connected to a user input and monitoring console so that a user may interact with and control the system.

7. A system according to claim 6, wherein said input and monitoring console is located in a different geographic location from the conveyor belt.

8. A system according to claim 1, wherein the system further includes a wheel-type encoder in contact with said conveyor belt for receiving conveyor belt velocity data, for converting said belt velocity data into an electronic signal representative of belt velocity, and for transmitting said electronic signal representative of belt velocity to a counter module included in the PLC.

9. A system according to claim 8, wherein said wheel-type encoder includes a wheel formed from plastic or rubber and biasing means for biasing said wheel against the surface of the conveyor belt, wherein slippage of said wheel against the surface of the belt is prevented and accuracy of said belt velocity data is optimal.

10. A system according to claim 1, wherein said PLC is configured to record and store data regarding changes in said metallic element, wherein said metallic element comprises one or more members of the group consisting of: belt reinforcement cords, rip panels and splice joints.

11. A system according to claim 10, wherein said rip panels further comprise one or more of the members of the group consisting of: aerial type panels, non-metallic magnetic panels, and non-metallic conductive panels.

12. A system according to claim 1, wherein said plurality of sensors comprise at least one of electric coils and Hall Effect sensors.

13. A system according to claim 1, wherein said conveyor belt includes at least one radio frequency identification (RFID) chip, said RFID chip providing information to said system relating to said at least one RFID chip, a rip panel associated with said at least one RFID chip, or a belt splice associated with said at least one RFID chip.

14. A system according to claim 1, wherein said system further includes at least one radio frequency identification (RFID) chip electrically connected to a conductive loop in the conveyor belt, said loop including legs extending across at least a portion of the width of the conveyor belt, and the RFID chip operable for sending a current through said legs.

15. A system according to claim 1, wherein said plurality of sensors are arranged into groups housed within a housing mounted adjacent to and spanning the width of said conveyor belt, said housing shaped generally complementarily to the cross section of said conveyor belt, each group of sensors analyzing a corresponding belt channel defined by an endless longitudinal section of said conveyor belt.

16. A system according to claim 15, wherein said PLC is operable for generating a graphical representation of each of the channels for simultaneous display to a user.

17. A conveyor belt condition monitoring system, comprising:
a plurality of sensors arranged adjacent a surface of a conveyor belt for sensing a disruption in a magnetic field induced by a permanent magnet in a magnetized metallic conveyor belt element;
a programmable logic controller (PLC) for receiving a signal from at least one of said plurality of sensors and analyzing said signal to assess a condition of said metallic conveyor belt element;
a user interface operably connected to said PLC such that a user may interact with and control the system;
a display for providing a visual representation to a user of said condition of said metallic conveyor belt element; and
an interrogation unit positioned in close proximity to the belt for turning on a radio frequency identification (RFID) chip electrically connected to a conductive loop in or on said belt, said chip energizing the loop.

18. A system according to claim 17, wherein said PLC is connected to the system via an Ethernet link for receiving data about the belt element, said controller having modules so that portions of the PLC may be selectively integrated into a facility-wide industrial monitoring system.

19. A system according to claim 17, wherein the system further includes a scanner for receiving conveyor belt thickness information and transmitting said belt thickness information to said PLC.

20. A system according to claim 17, wherein said plurality of sensors are arranged into groups housed within a housing mounted adjacent to and spanning the width of said conveyor belt, said housing shaped generally complementarily to the cross section of said conveyor belt, each group of sensors analyzing a corresponding belt channel defined by an endless longitudinal section of said conveyor belt.

21. A system according to claim 20, wherein said PLC is effective for generating a graphical representation of each of the channels for simultaneous display to a user.

22. A system according to claim 17, wherein said metallic conveyor belt element includes one or more members of the group consisting of a steel cord, a splice and a rip panel.

23. A system according to claim 22, wherein said rip panels further comprise one or more of the members of the group consisting of: aerial type panels, non-metallic magnetic panels, and non-metallic conductive panels.

24. A system according to claim 23, wherein the system further includes a loop transmitter and a loop receiver in communication with said PLC for transmitting and receiving signals, respectively, representative of information about said rip panels.

25. A system according to claim 17, wherein said conveyor belt includes at least one other radio frequency identification (RFID) chip, said RFID chip providing information to said system relating to said at least one other RFID chip, a rip panel associated with said at least one other RFID chip, or a belt splice associated with said at least one other RFID chip.

26. A system according to claim 17, wherein said graphical user interface is located in a different geographic location from the conveyor belt.

27. A conveyor belt condition monitoring system, comprising:
a permanent magnet for magnetizing a metallic conveyor belt element;
a plurality of sensors for sensing a disruption in a magnetic field induced by the permanent magnet in the metallic conveyor belt element;
a programmable logic controller (PLC) for receiving a signal from at least one of said plurality of sensors and analyzing said signal to assess a condition of said metallic conveyor belt element;
a display for providing a visual representation to a user of said condition of said metallic conveyor belt element, said visual representation comprises one or more information configurations of the group consisting of a learn mode configuration, a historical monitoring configuration, a non-historical monitoring configuration, a full-screen configuration, and a refined full-screen configuration.

28. A system according to claim 27, wherein said system is operably connected to one or more members of the group consisting of: a facility-wide monitoring system, an Intranet, a virtual private network and the Internet.

29. A system according to claim 27, wherein said system further includes a user input and monitoring console connected to the PLC such that a user may interact with and control said system.

30. A system according to claim 27, wherein said PLC is connected to the system via an Ethernet link for receiving data about the belt element, said controller having modules so that portions of the PLC may be selectively integrated into a facility-wide industrial monitoring system.

31. A system according to claim 27, further comprising at least one camera operably connected to the system for transmitting visual information regarding the conveyor belt to said display for viewing by a user.

32. A system according to claim 27, wherein said system further includes a belt control operably connected to said PLC for receiving a signal from said PLC and for directly or indirectly altering operation of the conveyor belt in response to that signal.

33. A system according to claim 27, wherein said plurality of sensors analyzes the conveyor belt by defining separate channels, each of said channels corresponding to an endless longitudinal section of said conveyor belt.

34. A system according to claim 33, wherein said refined full-screen configuration further comprises a graphical representation of each of the channels for simultaneous display to a user.

35. A system according to claim 27, wherein said learn mode configuration further comprises a display of event data relating to said metallic conveyor belt element, including the date and location on the belt corresponding to said event data.

36. A system according to claim 27, wherein said historical monitoring configuration further comprises a display of values representative of alarm and trip tolerances for events specific to a particular conveyor belt.

37. A system according to claim 27, wherein said non-historical monitoring configuration further comprises a display of values representative of alarm and trip tolerances for events specific to a particular conveyor belt.

38. A system according to claim 27, wherein said metallic conveyor belt element includes one or more members of the group consisting of a steel cord, a splice and a rip panel.

39. A system according to claim 27, wherein said system is operably connected to one or more members of the group consisting of: a facility-wide monitoring system, an Intranet, a virtual private network and the Internet.

* * * * *